(12) United States Patent
Artz

(10) Patent No.: US 6,578,312 B1
(45) Date of Patent: Jun. 17, 2003

(54) ILLUMINATED FISHING ROD

(76) Inventor: Dave Artz, 2100 Clark Rd., Salisbury, NC (US) 28146

( * ) Notice: Subject to any disclaimer, the term of this patent is extended or adjusted under 35 U.S.C. 154(b) by 0 days.

(21) Appl. No.: 09/917,161

(22) Filed: Jul. 27, 2001

(51) Int. Cl.⁷ .............................................. A01K 85/00
(52) U.S. Cl. ...................................................... 43/17.5
(58) Field of Search .................. 43/17.5, 18.1

(56) References Cited

U.S. PATENT DOCUMENTS

| | | | |
|---|---|---|---|
| 2,565,633 A | 8/1951 | Scott | |
| 4,026,059 A | 5/1977 | Ochs | |
| 4,118,882 A | * 10/1978 | Gorsky | ........................... 43/17 |
| 5,276,990 A | 1/1994 | Ramirez | |
| 5,293,710 A | * 3/1994 | Mills | ............................... 43/17 |
| 5,347,741 A | 9/1994 | Konrad | |
| D380,806 S | 7/1997 | Ostrander | |
| 6,000,808 A | 12/1999 | Hansen | |
| 6,122,853 A | * 9/2000 | Genous-Moore | ............ 43/17.5 |
| 6,149,286 A | * 11/2000 | Wiggins | ...................... 362/259 |

* cited by examiner

Primary Examiner—Kurt Rowan
Assistant Examiner—Bethany L Griles

(57) ABSTRACT

An illuminated fishing rod for sensing when a fish strikes the fishing line and alerting the user by means of an indicator light while fishing in darkness. The illuminated fishing rod includes a fishing rod having a light assembly and a sensor for detecting when a fish has struck the fishing line, thereby illuminating an indicator lamp on the rod.

1 Claim, 3 Drawing Sheets

ILLUMINATED FISHING ROD

BACKGROUND OF THE INVENTION

1. Field of the Invention

The present invention relates to illuminated fishing rods and more particularly pertains to a new illuminated fishing rod for sensing when a fish strikes the fishing line and alerting the user by means of an indicator light while fishing in darkness.

2. Description of the Prior Art

The use of illuminated fishing rods is known in the prior art. More specifically, illuminated fishing rods heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,276,996; U.S. Pat. No. 5,347,741; U.S. Pat. No. Des. 380,806; U.S. Pat. No. 6,000,808; U.S. Pat. No. 4,026,059; and U.S. Pat. No. 2,565,633.

While these devices fulfill their respective, particular objectives and requirements, the aforementioned patents do not disclose a new illuminated fishing rod. The inventive device includes a fishing rod having a light assembly and a sensor for detecting when a fish has struck the fishing line, thereby illuminating an indicator lamp on the rod.

In these respects, the illuminated fishing rod according to the present invention substantially departs from the conventional concepts and designs of the prior art, and in so doing provides an apparatus primarily developed for the purpose of sensing when a fish strikes the fishing line and alerting the user by means of an indicator light while fishing in darkness.

SUMMARY OF THE INVENTION

In view of the foregoing disadvantages inherent in the known types of illuminated fishing rods now present in the prior art, the present invention provides a new illuminated fishing rod construction wherein the same can be utilized for sensing when a fish strikes the fishing line and alerting the user by means of an indicator light while fishing in darkness.

The general purpose of the present invention, which will be described subsequently in greater detail, is to provide a new illuminated fishing rod apparatus and method which has many of the advantages of the illuminated fishing rods mentioned heretofore and many novel features that result in a new illuminated fishing rod which is not anticipated, rendered obvious, suggested, or even implied by any of the prior art illuminated fishing rods, either alone or in any combination thereof.

To attain this, the present invention generally comprises a fishing rod having a light assembly and a sensor for detecting when a fish has struck the fishing line, thereby illuminating an indicator lamp on the rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new illuminated fishing rod apparatus and method which has many of the advantages of the illuminated fishing rods mentioned heretofore and many novel features that result in a new illuminated fishing rod which is not anticipated, rendered obvious, suggested, or even implied by any of the prior art illuminated fishing rods, either alone or in any combination thereof.

It is another object of the present invention to provide a new illuminated fishing rod which may be easily and efficiently manufactured and marketed.

It is a further object of the present invention to provide a new illuminated fishing rod which is of a durable and reliable construction.

An even further object of the present invention is to provide a new illuminated fishing rod which is susceptible of a low cost of manufacture with regard to both materials and labor, and which accordingly is then susceptible of low prices of sale to the consuming public, thereby making such illuminated fishing rod economically available to the buying public.

Still yet another object of the present invention is to provide a new illuminated fishing rod which provides in the apparatuses and methods of the prior art some of the advantages thereof, while simultaneously overcoming some of the disadvantages normally associated therewith.

Still another object of the present invention is to provide a new illuminated fishing rod for sensing when a fish strikes the fishing line and alerting the user by means of an indicator light while fishing in darkness.

Yet another object of the present invention is to provide a new illuminated fishing rod which includes a fishing rod having a light assembly and a sensor for detecting when a fish has struck the fishing line, thereby illuminating an indicator lamp on the rod.

Still yet another object of the present invention is to provide a new illuminated fishing rod that would alert the user as to when a fish has struck the line by means of a sensing device on the pole, thereby lighting an indicator lamp.

Even still another object of the present invention is to provide a new illuminated fishing rod that allows the user to fish in darkness more effectively.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
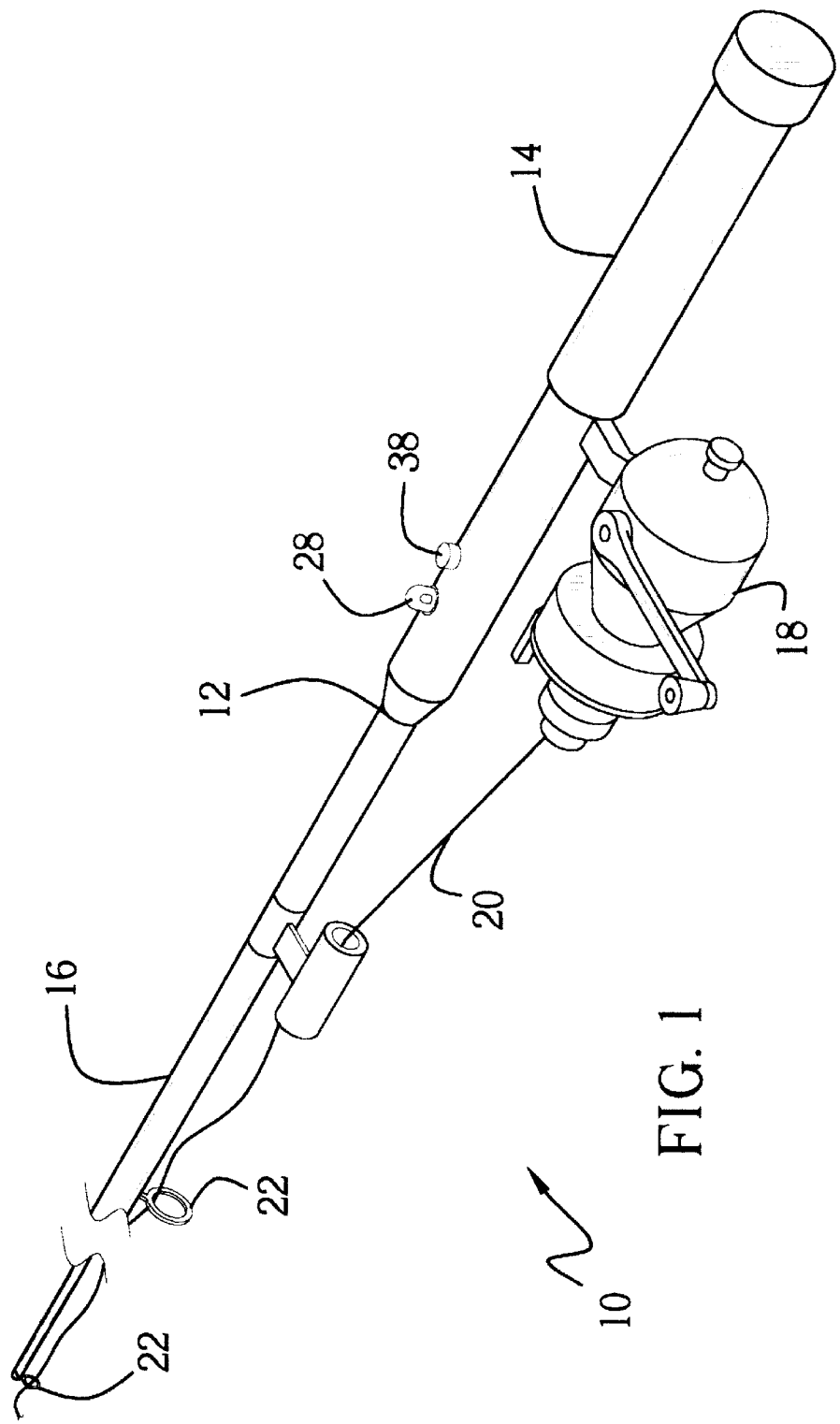
FIG. 1 is a schematic perspective view of a new illuminated fishing rod according to the present invention in the preferred embodiment.
Figure 2:
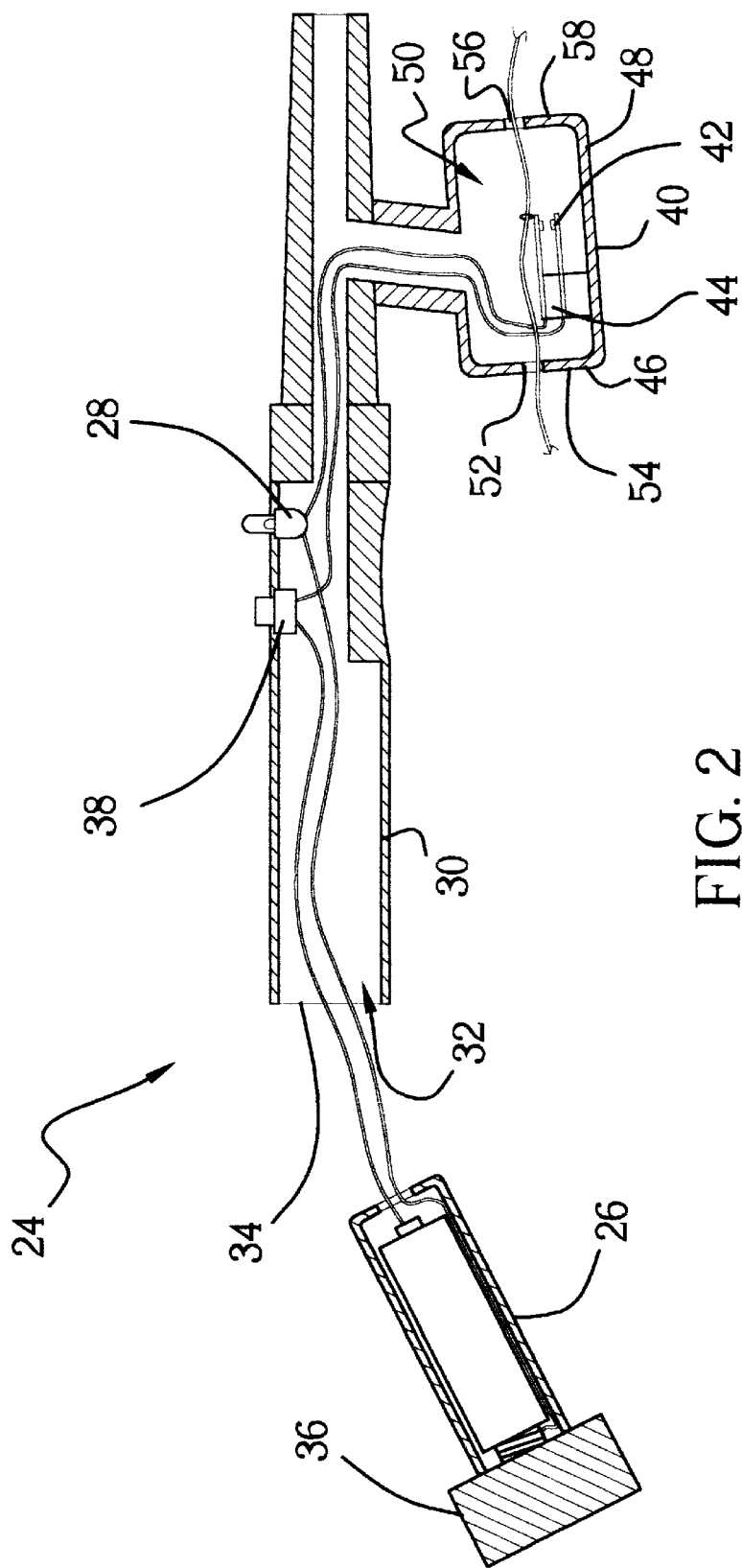
FIG. 2 is a sectional view of the lower portion of the present invention.
Figure 3:
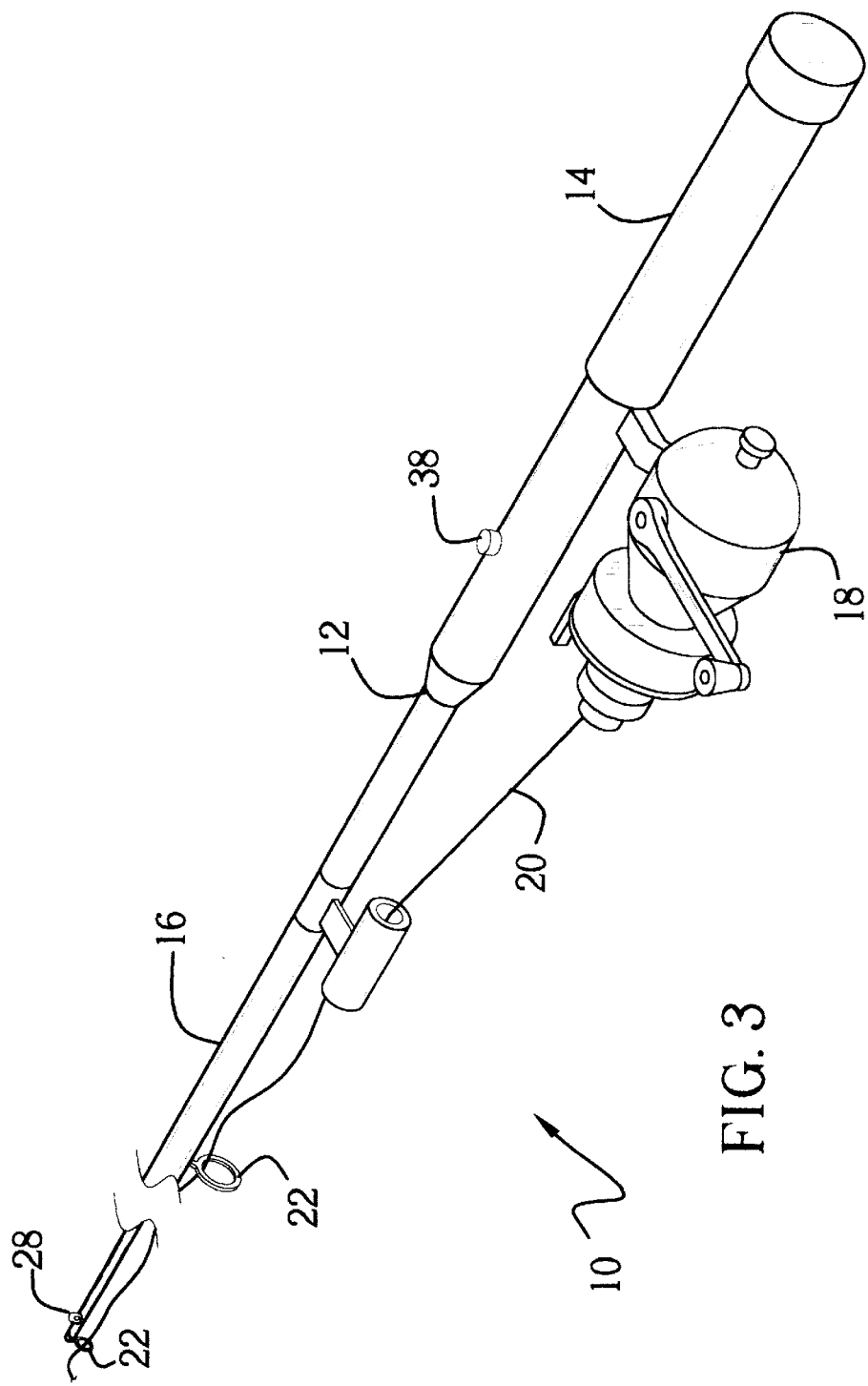
FIG. 3 is a schematic perspective view of the present invention in an alternate embodiment.

With reference now to the drawings, and in particular to FIGS. 1 through 3 thereof, a new illuminated fishing rod embodying the principles and concepts of the present invention and generally designated by the reference numeral 10 will be described.

As best illustrated in FIGS. 1 through 3, the illuminated fishing rod 10 generally comprises a fishing rod 12 includes a handle portion 14 and an extension portion 16. The handle portion 14 is designed for being gripped by a user when the user is fishing. The extension portion 16 outwardly extends from the handle portion 14.

A reel 18 is coupled to the handle portion 14 of the fishing rod 12. The reel 18 includes a line 20 extending outwardly from the reel 18. The reel 18 is for retracting the line 20 after the line 20 has been cast. The line 20 is extended through a plurality of eyelets 22 coupled to the extension portion 16 of the fishing rod 12. The extension portion 16 acts on the line 20 extending through the eyelets 22 when the handle portion 14 of the fishing rod 12 is pivoted upwardly.

A light assembly 24 is coupled to the fishing rod 12. The light assembly 24 emits light for illuminating the fishing rod 12 such that the light assembly 24 is designed for facilitating detection of the line 20 being struck by the fish.

The light assembly 24 includes a power supply 26 and a light emitter 28. The light emitter 28 is operationally coupled to the power supply 26 such that the power supply 26 supplies power to the light emitter 28. The light emitter 28 is coupled to the fishing rod 12 such that the light emitter 28 is movable when the fish strikes the line 20 thereby the light emitter 28 is designed for facilitating identification by the user of the fish striking the line 20 when the user is fishing at night.

The handle portion 14 of the fishing rod 12 includes a perimeter wall 30 defining an interior space 32. The interior space 32 of the handle portion 14 includes an open end 34. The open end 34 of the interior space 32 facilitates insertion of the power supply 26 into the interior space 32 of the handle portion 14 for storing of the power supply 26 when the user is fishing. A cap 36 is removably couplable to the handle portion 14 for selectively closing the open end 34 of the interior space 32 when the power supply 26 is stored in the interior space 32 of the handle portion 14 of the fishing rod 12.

The light assembly 24 includes a switch 38. The switch 38 is operationally coupled to the light emitter 28 and the power supply 26. The switch 38 is coupled to the fishing rod 12. The switch 38 is designed for being actuated by the user when the user is holding the fishing rod 12 such that actuation of the switch 38 controls power supplied to the light emitter 28 from the power supply 26 for turning the light emitter 28 on and off.

The light assembly 24 includes a strike sensing assembly 40. The strike sensing assembly 40 is operationally coupled between the light emitter 28 and the power supply 26. The strike assembly senses tension in the line 20 when the line 20 is struck by the fish thereby permitting power to be supplied to the light emitter 28 such that the light emitter 28 is designed for emitting light for alerting the user when the fish has struck the line 20.

The strike sensing assembly 40 includes a pair of contacts 42 and a grommet 44. The grommet 44 is coupled to an associated one of the contacts 42. The contacts 42 are operationally coupled between the power supply 26 and the light emitter 28. The contacts 42 are positioned in a spaced relationship such that the contacts 42 are not contacting each other such that power from the power supply 26 to the light emitter 28 is interrupted. The line 20 extends through the grommet 44 of the strike sensing assembly 40. Increased tension of the line 20 when the line 20 is struck by the fish flexes the associated one of the contacts 42 towards the other of the contacts 42 thereby permitting contact between the contacts 42 and permitting power from the power supply 26 to be supplied to the light emitter 28 for emitting light.

A housing 46 includes a peripheral wall 48 defining an interior cavity 50. The housing 46 is coupled to the fishing rod 12. The strike sensing assembly 40 is positioned within the interior cavity 50 of the housing 46. The housing 46 includes a first aperture 52 positioned at a first end 54 of the housing 46. The housing 46 includes a second aperture 56 positioned at a second end 58 of the housing 46. The first aperture 52 and the second aperture 56s permit the line 20 to extend through the housing 46 such that the line 20 operationally engages the strike sensing assembly 40.

As an alternate embodiment, the light assembly 24 is located at a most outer end of the extension portion 16 of the fishing rod.

As to a further discussion of the manner of usage and operation of the present invention, the same should be apparent from the above description. Accordingly, no further discussion relating to the manner of usage and operation will be provided.

With respect to the above description then, it is to be reelized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An illuminated fishing rod for aiding in detecting strikes by a fish when fishing at night, the illuminated fishing rod comprising:

a fishing rod having a handle portion and an pole portion, said handle portion of said fishing rod having a perimeter wall defining an interior space, said handle portion having a cap being removably couplable to said handle portion for selectively closing said open end of said interior space;

said fishing rod including a reel being coupled to said handle portion of said fishing rod and having a line extending outwardly from said reel through a plurality of eyelets coupled to said pole portion of said fishing rod;

a power supply being positionable in said interior space of said handle portion of said fishing rod;

a light emitter being mounted on said fishing rod, said light emitter being electrically coupled to said power supply;

a switch for allowing the user to selectively enable and disable said light emitter for the purpose of conserving said power supply, said switch being mounted to and extending outwardly from said perimeter wall of said handle portion of said fishing rod such that said switch is accessible to the user, said switch being electrically coupled to said power supply;

a strike sensing assembly for sensing tension in said line when said line is struck by the fish, said strike assembly being electrically coupled to said power supply;

said strike sensing assembly having a pair of electrical contacts spaced apart from each other, wherein said fishing line is operationally coupled to a first of said contacts such that tension on said line resulting from a fish strike biases each of said contacts together illuminating said light emitter providing a visual indication of the strike to a user;

said interior space of said handle portion having an open end for receiving said power supply such that said power supply is selectively positionable in said interior space through said open end, said strike sensing assembly including a grommet being coupled to said first of said contacts, said contacts being electrically coupled between said power supply and said light emitter, said line extending through said grommet of said first of said contacts such that increased tension of said line biases said first of said contacts against the other of said contacts such that said light emitter illuminates when said switch is in an on position;

an elongate housing for mounting to said pole portion of said fishing rod, said housing having a pair of end walls and a peripheral wall attached to and extending between said end walls defining an interior cavity, said housing being positioned proximate to said handle portion and being oriented generally parallel to said pole portion, said strike sensing assembly being mounted in said interior cavity of said housing, said housing having a pair of apertures extending through said end walls permitting said line to extend through said housing such that said line is operationally couplable to said strike sensing assembly;

said light emitter being positionable on said handle portion of said fishing rod located generally adjacent to said switch; and said light emitter being positionable on said pole portion of said fishing rod located generally adjacent to an outermost eyelet.

* * * * *